June 1, 1954

H. M. MELLEN 2,679,994

CHRISTMAS TREE STAND

Filed Jan. 15, 1951

Harold M. Mellen
INVENTOR.

Patented June 1, 1954

2,679,994

UNITED STATES PATENT OFFICE 2,679,994

CHRISTMAS TREE STAND

Harold M. Mellen, Lena, Ill.

Application January 15, 1951, Serial No. 205,994

1 Claim. (Cl. 248—47)

This invention relates to new and useful improvements and structural refinements in stands for Christmas trees, and the principal object of the invention is to firmly and dependably support the tree by virtue of its own weight, this being achieved by providing a socket for the lower end of the tree trunk and pivotally connecting a plurality of legs to the socket for sustaining the latter in an elevated position above a supporting surface, the upper end portions of the legs assuming the form of toothed cams which grip the tree truk in the socket and thereby firmly sustain the tree in the stand.

Some of the advantages of the invention reside in its simplicity of construction, in its dependable operation, in its adjustability to accommodate tree trunks of different diameters, in its convenient foldability, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
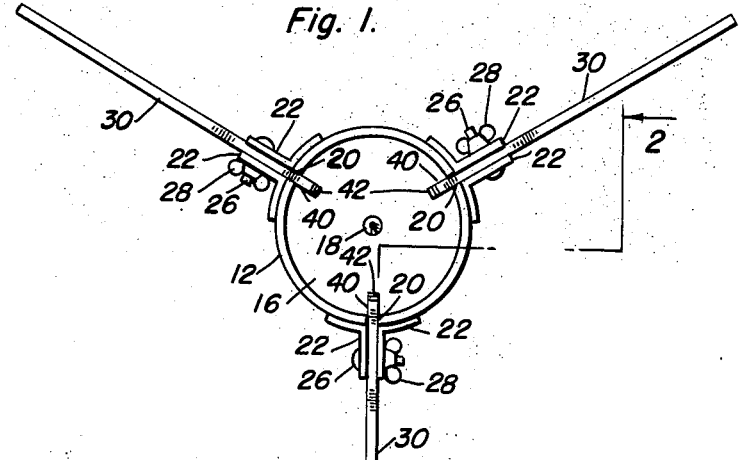
Figure 1 is a top plan view of the invention.
Figure 3:
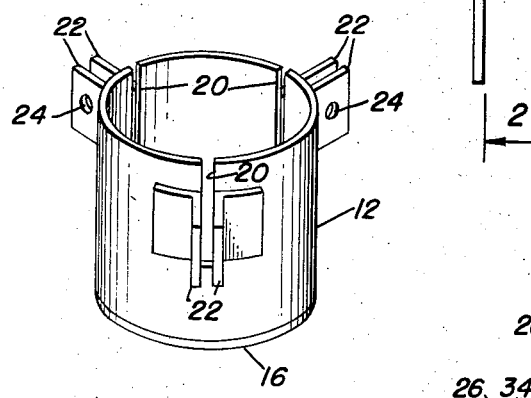
Figure 3 is a perspective view of the socket per se.

Referring now to the accompanying drawings in detail, the invention consists of a Christmas tree stand which is designated generally by the reference character 10 and embodies in its construction a vertically disposed, tubular socket 12 adapted to receive a tree trunk 14, the socket 12 having a bottom 16 provided with an upstanding tree trunk engaging prong 18, as will be clearly apparent.

The upper edge portion of the socket 12 is provided with a plurality of downwardly extending slots 20 which are open at the upper ends thereof, and a pair of angle brackets 22 are secured to the outer surface of the socket at the opposite sides of each slot, these brackets being provided with registering apertures 24 to receive a pivot pin or screw 26 equipped with a wing nut 28.

A set of legs 30, configurated substantially as shown, are provided intermediate the ends thereof with elongated recesses or slots 32 to receive the respective pivot screws 26, each slot 32 being formed in its upper edge with a plurality of notches 34 to afford seats for the selective reception of the screws 26. In other words, the screw 26 extending through each of the legs 30, may be received in any one of the notches 34, whereby the inner end portions of the legs which project through the respective slots 20 into the socket 12 may be shifted toward or away from the tree trunk 14, thus enabling the device to accommodate tree trunks of different diameters.

The lower ends of the legs 30 are bevelled as at 36 to rest on a supporting surface 38, while the upper or inner end portions of the legs assume the form of cams 40 which are provided with sets of teeth 42 for gripping engagement with the tree trunk.

Figure 2:
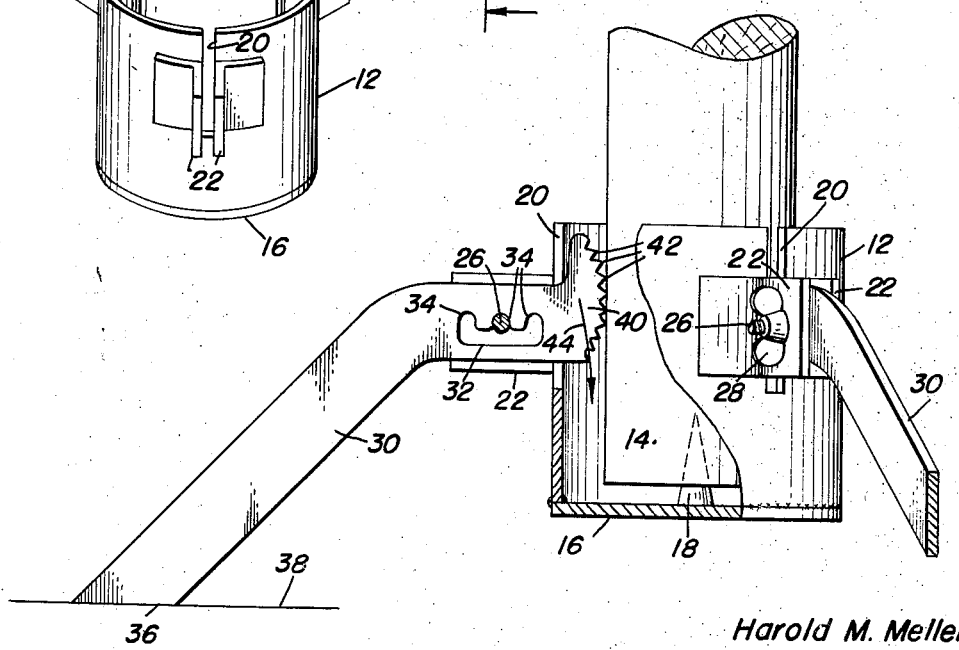
Figure 2 is a fragmentary sectional view, taken substantially in the plane of the line 2—2 in Figure 1 and illustrating a tree trunk in position in the socket.

It is to be noted that the legs 30 extend downwardly beyond the bottom 16 of the socket 12 so that the socket is supported in an elevated position above the surface 38, and when the invention is placed in use and the tree trunk is inserted in the socket, the weight of the tree will tend to urge the socket downwardly, thus firmly engaging the teeth 42 of the cams 40 with the trunk of the tree, as indicated by the arrow 44 in Figure 2. As has been already stated, the legs 30 may be adjusted relative to the pivot screws 26 by virtue of the slots 32 and notches 34, so that the toothed cams 40 are able to accommodate tree trunks of different diameters.

Finally, it is to be noted that the bottom portion of socket 12 assumes the form of a cup or receptacle for water or other liquid, whereby to preserve the tree in a fresh condition for a substantial period of time.

It is believed that the advantages and use of the invention will be clearly understood from the foregoing disclosure and accordingly, further description thereof at this time is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a Christmas tree stand, the combination of a tree trunk receiving socket provided in its upper edge portion with a plurality of circumferentially spaced vertical recesses open at the upper end thereof, pairs of outwardly projecting brackets secured to the outer surface of said socket at the opposite side edges of the respective recesses, a horizontal fulcrum pin extending transversely through each pair of said brackets, a plurality of downwardly divergent legs having substantially horizontal upper portions disposed between the respective pairs of brackets and projecting radially into said socket through the respective recesses, the horizontal portions of said legs being provided with horizontal slots and with a plurality of spaced notches constituting inverted seats in the upper edge of each slot, and tree trunk engaging members provided in said socket at the inner ends of the horizontal potrions of the respective legs, said fulcrum pins extending through the slots of the respective legs and being received selectively in said seats whereby said members may be adjusted horizontally toward and away from the vertical axis of said socket.

References Cited in the file of this patent

UNITED STATES PATENTS

| Number | Name | Date |
|---|---|---|
| 431,745 | Haven | July 8, 1890 |
| 1,348,121 | Kuderer | July 27, 1920 |
| 1,492,880 | Huna | May 6, 1924 |
| 1,512,416 | Gilmore | Oct. 21, 1924 |
| 1,548,410 | Derbyshire | Aug. 4, 1925 |
| 1,729,129 | Seelav | Sept. 24, 1929 |
| 2,014,896 | Hollander | Sept. 17, 1935 |

FOREIGN PATENTS

| Number | Country | Date |
|---|---|---|
| 6,962 | Germany | of 1897 |
| 391,164 | Germany | Feb. 29, 1924 |